United States Patent [19]
Everett, Jr.

[11] Patent Number: 5,034,817
[45] Date of Patent: Jul. 23, 1991

[54] RECONFIGURABLE VIDEO LINE DIGITIZER AND METHOD FOR STORING PREDETERMINED LINES OF A COMPOSITE VIDEO SIGNAL

[75] Inventor: Hobart R. Everett, Jr., San Diego, Calif.

[73] Assignee: The United States of America as represented by the Secretary of the Navy, Washington, D.C.

[21] Appl. No.: 486,465

[22] Filed: Feb. 28, 1990

[51] Int. Cl.⁵ .............................................. H04N 5/14
[52] U.S. Cl. .................................... 358/160; 358/107; 358/126
[58] Field of Search ........................ 358/107, 126, 160

[56] References Cited
U.S. PATENT DOCUMENTS
3,707,598 12/1972 Scarbrough ......................... 358/126

Primary Examiner—John W. Shepperd
Attorney, Agent, or Firm—Harvey Fendelman; Thomas Glenn Keough; Michael A. Kagan

[57] ABSTRACT

A video line digitizer for digitizing predetermined lines of successive frames of a composite video signal includes a video line digitizer for converting the analog component of the video signal into a series of digital data representations. The composite video signal consists of successive frames. The frames each consist of a fixed number of lines represented by a fixed number of pixels. The pixels each have an associated intensity value reflected in the resulting digital data representations. The video line digitizer also provides synchronization signals decoded from the composite video signal to an address decoder/controller which determines the beginning of each horizontal line of the image. A high-speed RAM receives the digital data representations from the video line digitizer and stores them in address locations provided to the RAM by the address decoder/controller when the RAM is enabled by a data processor. The data processor receives the sync signals from the video line digitzer in order to identify the end of the designated line of interest. The data processor then disables the RAM from receiving additional data and directs the RAM to download the stored data into another RAM in the processor, from which the processor later retrieves the data for subsequent analysis.

19 Claims, 13 Drawing Sheets

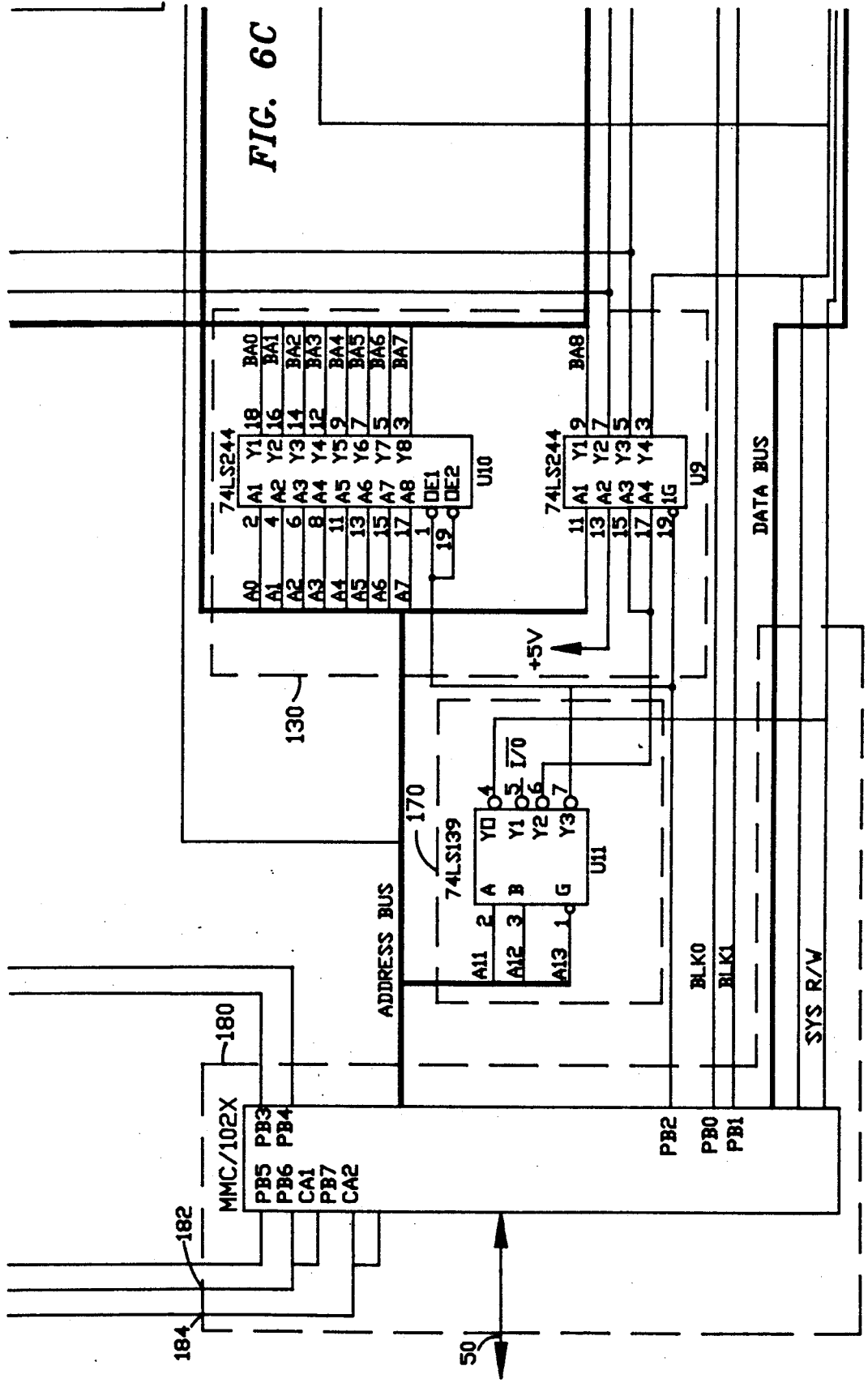

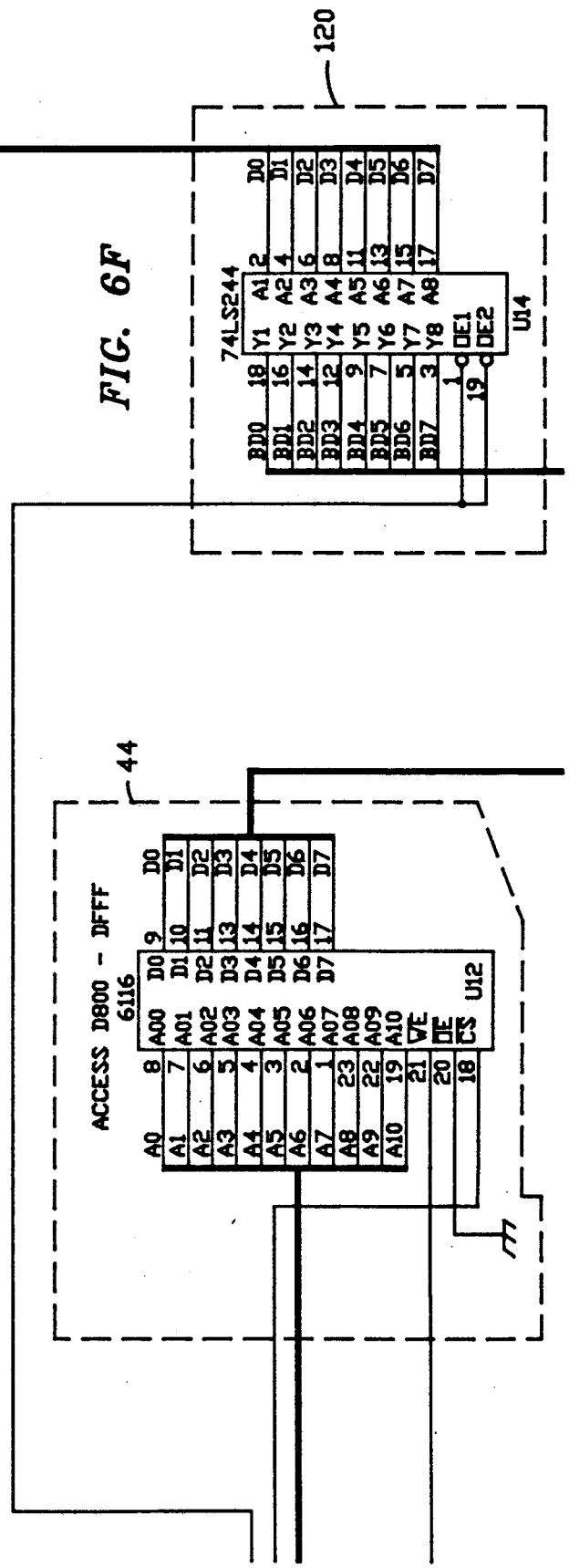

RECONFIGURABLE VIDEO LINE DIGITIZER AND METHOD FOR STORING PREDETERMINED LINES OF A COMPOSITE VIDEO SIGNAL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of image processing, and more particularly to digitally storing one or more selected scan lines from a composite video signal in real time.

Typically, the first step in image processing is acquisition of the image by a video camera viewing the scene of interest that provides a composite video signal. A composite video signal, such as an NTSC (National Television Standards Committee) signal, consists of successive frames having a fixed number of lines. Each line is composed of a fixed number of pixels (pixel elements) where each pixel has an associated intensity.

Referring to FIG. 7, which illustrates a single horizontal line of an NTSC composite video signal in graphical form, images are formed from a continuous analog signal representing a line-by-line scanning of the picture brightness along each line. At the beginning of each scan line, timing information is inserted to provide triggering and a sufficient interval for the camera setup. A horizontal sync pulse follows the "front porch" and identifies the beginning of a line of the video signal. A vertical sync pulse, not shown, is provided to identify the beginning of every frame.

The composite video signal is transformed into an appropriate digital representation consisting of one or more frames each represented by an n×m array of elements.

Traditional approaches in image processing employ a "frame grabber" which consists of circuitry that converts an entire two dimensional video image into a corresponding digitized array which can then be stored in a computer memory. Each element of the array corresponds to a pixel of a horizontal line of the image. For every pixel there must exist an associated location in memory which stores a value corresponding to scene intensity (grey level) for that particular pixel. For example, the number of memory locations (bytes) necessary to store just one frame of a conventional 525-line NTSC television image having a resolution of 512 pixels per horizontal line is 268,800 (525×512). The second image processing step involves processing the acquired data. Due to the size of the array necessary to store one frame (525 by 512 elements), even the simplest of operations, such as thresholding to convert the video signal to a binary image, is time consuming. More elaborate operations simply cannot be done in real-time, and certainly not before the next image arrives at the NTSC rate of 60 frames/second.

Some applications, however, do not require all of the data captured by a conventional frame grabber. A good example of such an application is video motion detection as employed in automatic security systems for purposes of identifying the presence of an intruder in a scene under surveillance. Experiments have shown that in such physical security scenarios, it is possible to detect motion by examining only one horizontal line which cuts through the region of interest in the scene. Several horizontal lines equally spaced throughout the scene can be used to obtain full screen coverage, without the need to "grab" the entire frame. The image processing needs are thus greatly reduced, and in most cases can be performed during the wait period between lines of interest when the acquisition system is idle, i.e., in real time. As an example, in an application where capture of only a single line is sufficient, the memory size requirement is reduced to half a kilobyte, and approximately 16.4 milliseconds are available for processing before the next line must be digitized.

Accordingly, an object of the present invention is to provide a video line digitizer that can reconfigure itself to identify and store different predetermined lines in response to the outcomes of one or more decisions. Another object of the present invention is to provide a video line digitizer that requires a relatively small memory capacity with respect to a frame grabber that stores an entire video frame. A further object of the present invention is to provide a video line digitizer that is small enough to fit on a mobile platform such as a robot. Another object of the invention is to provide an video line grabber that has a low power consumption. Yet another object of the present invention is to provide a video line digitizer that identifies and stores predetermined lines of successive video frames in real time and then provides an output functionally related to differences between those lines.

SUMMARY OF THE INVENTION

The present invention avoids the performance limitations of conventional frame grabbers that are limited to storing only complete frames of a composite video signal. The present invention comprises a video line digitizer for converting predetermined lines of successive frames of a composite video signal, such as an NTSC video signal, into a digital data representation of the video signal. An NTSC signal consists of successive frames having a fixed number of lines. Each line is composed of a fixed number of pixels where each pixel has an associated intensity. The digital data representation corresponds to the intensities of the respective pixels along the horizontal line. The digitizer also provides a digital output consisting of horizontal and vertical sync pulses extracted from the composite video signal and also provides a pixel clock output. A high speed, random access memory (RAM) receives the digital data representation from the digitizer and stores the data in memory upon receipt of an instruction from an address decoder/controller when the controller detects the beginning of a predetermined video line. A data processor receives a control signal from the digitizer in order to identify the end of the video line. Then the data processor downloads the data from the high speed RAM into a secondary storage RAM. This process of identification, storage, and downloading is repeated with the storage RAM receiving digital data representations of predetermined lines of successive frames. The data processor uses this data for various purposes, depending on the application. One example of such a purpose would be to compare digital data representations of predetermined lines from successive frames, and provide an output functionally related to the comparisons.

Once the predetermined identity (line number) of the desired line to be digitized is provided to the present invention, the step of acquiring this line, in the preferred embodiment, is accomplished through use of an external event counter, used as a line counter, which can be accessed by the firmware resident on the controlling data processor. This line counter is reset for each new video frame by the associated vertical sync pulse, and automatically incremented by the arrival of a horizontal sync pulse at the beginning of each line. A second counter is needed to identify the start of actual video information at a predetermined time after the arrival of the horizontal sync pulse, in order to ensure that digitization of the composite video signal begins at the proper time. A third counter is required to terminate the digitization sequence at the end of the video information on the predetermined line. The second and third counters are implemented directly in hardware as opposed to a combination of hardware/firmware in order to achieve the necessary quick response. The second counter is a delay counter that is driven by the pixel clock output of the video line digitizer, and reset by the horizontal sync pulse. The length of the desired delay is preset on a dip switch coupled to the delay counter. The third counter is a pixel counter which is then started after the delay counter times out.

The pixel counter directly increments the address of the high-speed video RAM, allowing it to store incoming data provided by the digitizer. This process is repeated for each new line in the frame, with the previously stored data values being overwritten by new data for the current line. When the internal line counter indicates to the data processor that the desired line has been stored in RAM, the data acquisition process is halted. Thus, values corresponding to the grey scale levels of the pixels that comprise the predetermined line are stored in the RAM. At this point the system switches from the "acquisition" mode to a "processing" mode, whereby the data processor transfers the contents of the video RAM into a storage RAM, accessible by the data processor for subsequent analysis. This acquisition cycle is continuously repeated to provided updated information about the visual scene being examined, with specific lines of interest designated by the data processor as appropriate.

DESCRIPTION OF THE DRAWINGS

FIGS. 6A-6G collectively provide an electrical circuit diagram that illustrates one means of implementing the block diagram presented in FIG. 3.

DESCRIPTION OF THE PREFERRED EMBODIMENT

Figure 1:
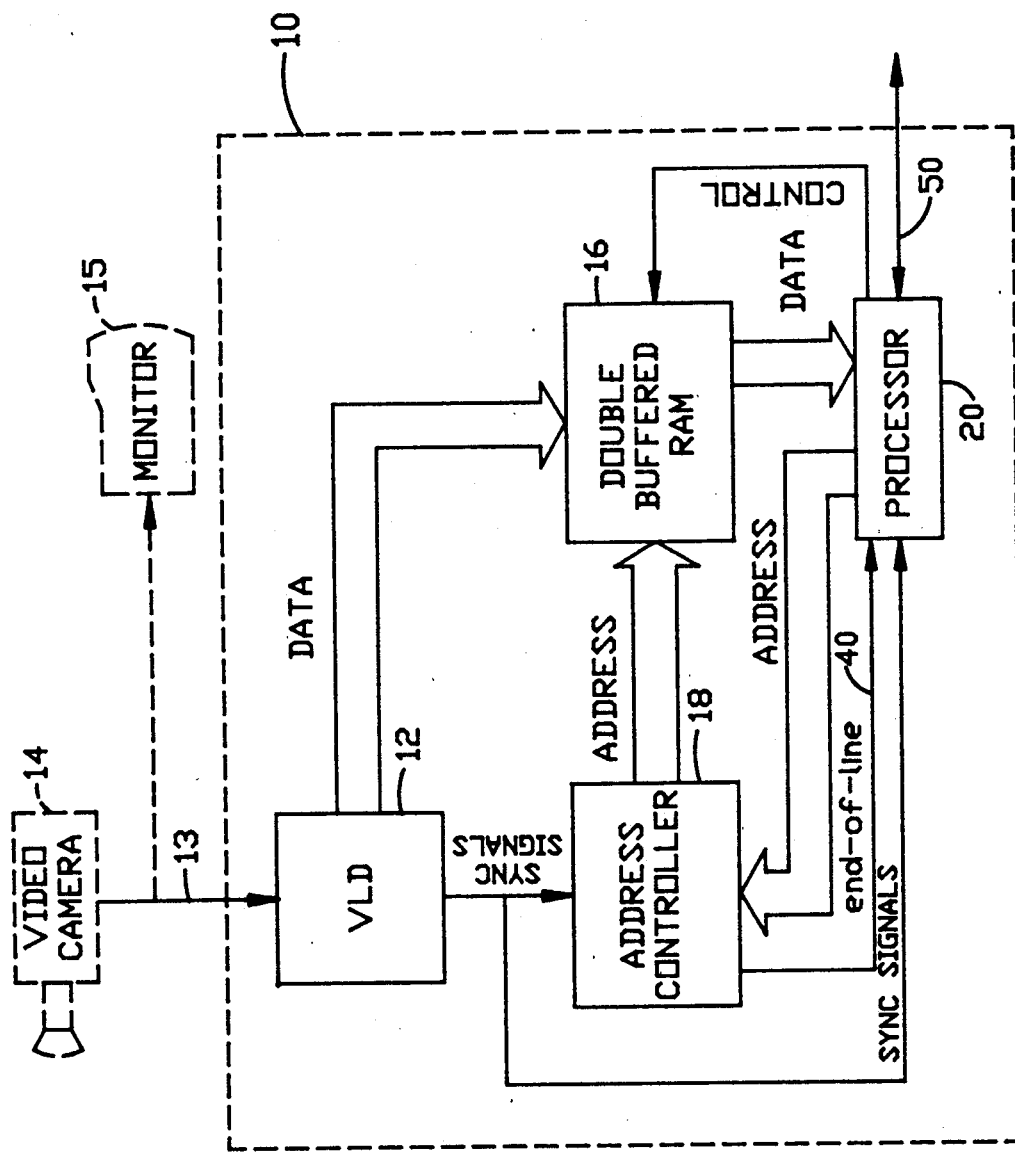
FIG. 1 is a block diagram that presents an overview of the present invention.
Figure 7:
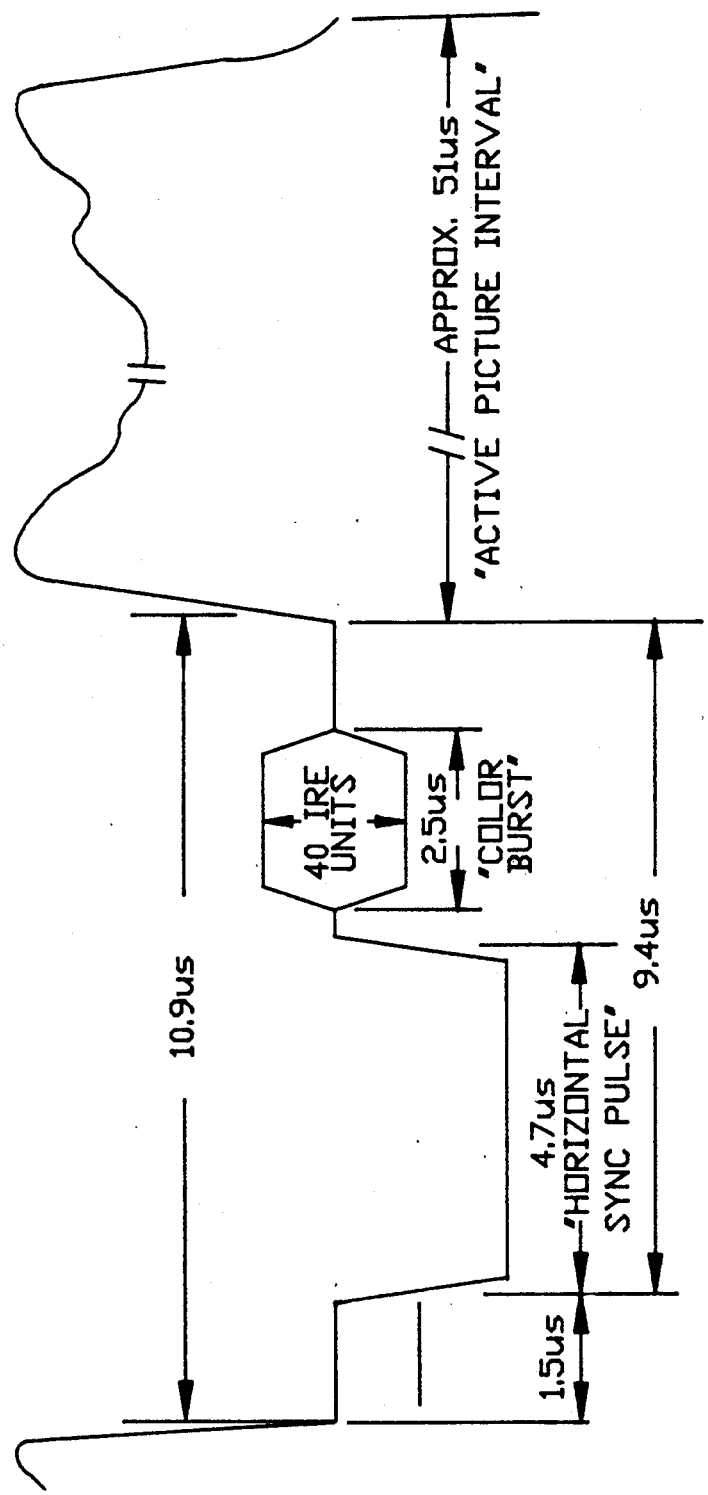
FIG. 7 illustrates a graphical representation of one line of an NTSC video signal.

Referring to FIG. 1, which illustrates a functional block diagram of the present invention, reconfigurable video line digitizer 10, there is shown video line digitizer (VLD) 12 which receives composite video signal 13. Composite video signal 13 may be provided, as shown by way of example only, from video camera 14, or from any other video signal source. Composite video signal 13 consists of successive frames each having a fixed number of lines that are composed of a number of pixels. One example of a composite video signal of this type is a National Television System Committee Standard (NTSC) video signal. Video digitizer 12 outputs digital synchronization signals consisting of information extracted from the composite video signal that can be correlated with frame arrival, horizontal line arrival, and pixel count; and converts the analog portion of the composite video signal (i.e, the active picture interval in FIG. 7) to a data representation of the intensity of each pixel of a horizontal line of the composite video signal. The data output representation is provided to double-buffered high-speed RAM (random access memory) 16 from digitizer 12.

Address controller 18 receives the sync signals from video line digitizer 12 from which address controller 18 continuously monitors the line number and pixel count of composite video signal 13 in real time. Address controller 18 provides address location control for double-buffered RAM 16 that allows RAM 16 to store the incoming data corresponding to the predetermined line in specific address locations. Upon the arrival of the predetermined line, address decoder controller 18 provides address information through output 38 to RAM 16 which directs RAM 16 to store the data being received by RAM 16 in particular memory addresses, as would be well known by those of ordinary skill who practice in this field of technology. Storage of a digitized data representation of the predetermined line of composite video signal 13 continues until a predetermined number of pixels are counted by an internal counter (not shown) in address controller 18 which receives pixel counts from VLD 12, and provides an end-of-line output 40 to data processor 20.

When the predetermined number of pixels are counted by address controller 18, data processor 20 prevents RAM 16 from storing any more data in accordance with a signal provided by a control link between data processor 20 and RAM 16. By way of example, when the composite video signal is an NTSC signal, which contains 512 pixels per line, storage of data in RAM 16 ceases when the pixel count reaches 512. This process by which incoming data corresponding to a predetermined line of video is stored may be referred to as the "data acquisition" mode of line digitizer 10.

Upon receipt of the end-of-line signal 40 from address controller 18, data processor 20 provides the appropriate address and control signals to double buffered RAM 16 whereby the data stored in RAM 16 is downloaded to another RAM (not shown) which is accessed by data processor 20 in order to analyze the data. Data processor 20 provides an output over link 50 which is functionally related to differences in pixel intensities for a given line, or between corresponding pixels of the same predetermined lines of successive frames. Optionally, a video monitor, such as video monitor 15, may be operably coupled to receive composite video signal 13 to provide a video image of the visual scene being digitized.

Figure 2:
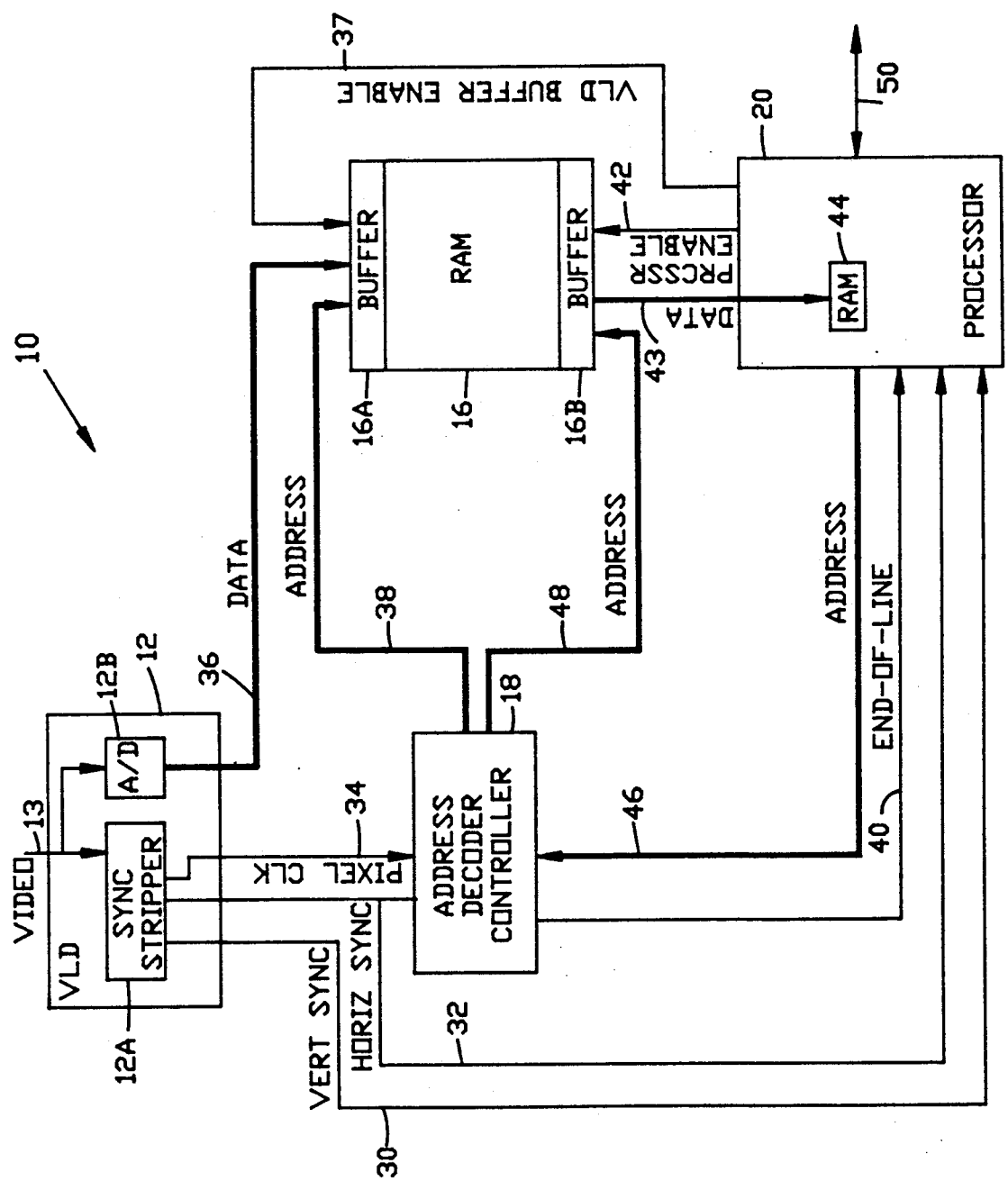
FIG. 2 is a block diagram of the present invention which elaborates on the diagram presented in FIG. 1.

FIG. 2 presents a more detailed view of reconfigurable video line digitizer 10 than does in FIG. 1, where video line digitizer 12 is shown to include sync stripper 12a and analog-to-digital converter 12b. A sync stripper is a circuit that extracts horizontal and vertical synchronization signals from a composite television video signal and is well known to those skilled in this technology. Sync stripper 12a receives composite video signal 13 and extracts vertical synchronization information provided by output 30, horizontal synchronization information provided by output 32 from the composite video signal, and generates pixel clock timing information provided by output 34. Analog-to-digital converter 12b converts analog portion of composite video signal 13 into a digital representation of composite video signal 13 that is provided at output 36.

Data output 36 is received by random access memory (RAM) 16 through buffer 16a which is enabled upon receipt of a VLD buffer-enable signal provided by output 37 from data processor 20 while buffer 16b is in a disabled condition. Storage of the digital representation of predetermined lines of the composite video signal in video RAM 16 is initiated by address decoder/controller 18 when it determines the presence of the predetermined line of interest, using information derived from horizontal sync output 32 and pixel clock output 34.

Data processor 20 receives vertical and horizontal synchronous outputs 30 and 32, respectively from video line digitizer 12 and is alerted to the "end-of-line" by output 40 of address decoder/controller 18. When the pixel count reaches a predetermined value, such as "512" when composite video signal 13 is an NTSC signal, the "end-of-line" signal provided by output 40 changes state, and data processor 20 directs reconfigurable video line digitizer 10 to change from the "data acquisition" mode into the "data processing" mode of operation. In this mode, data processor 20 provides a "processor-enable" signal through output 42 to enable buffer 16b, while buffer 16a is simultaneously held in a disabled condition, thereby allowing the data stored in video RAM 16 to be down loaded to storage RAM 44 of data processor 20. Data processor 20 also provides address information through output 46 to address controller 18. This information in turn is provided through output 48 and buffer 16b to RAM 16 so that the data stored in RAM 16 is accessed and downloaded through data bus 43 in proper sequence, by techniques well known by those skilled in this art.

The "acquisition" and "processing" modes are cyclically repeated so that after digital representations of predetermined lines are stored in RAM 44, data processor 20 processes the data in order to detect some particular scene attribute, such as motion, or discontinuities in pixel intensity values associated with edges. Data processor 20 also provides a signal through output 50 which is functionally related to differences in pixel intensity values. Mathematical techniques for manipulating digital intensity data such as stored in RAM 44 are well known by those skilled in the field of image processing, as are techniques for programming a data processor to accomplish these tasks.

Figure 3:
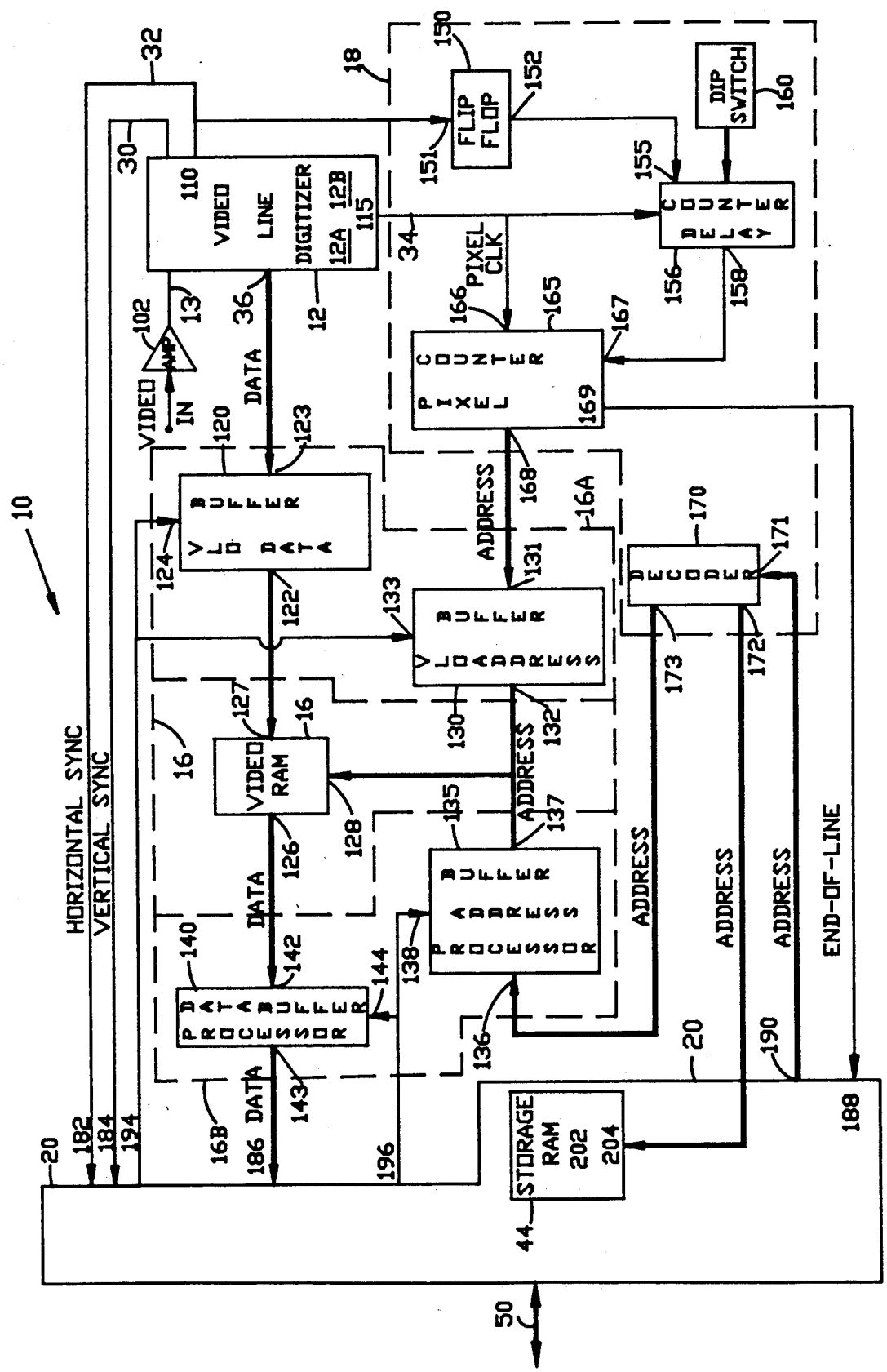
FIG. 3 is a block diagram depicting one means of implementing the present invention.

Referring to FIG. 3, which illustrates a detailed block diagram of one means of implementing line digitizer 10 that further expounds upon FIG. 2, there is shown video line digitizer (VLD) 12 which includes sync stripper 12a and flash analog-to-digital converter 12b. Video line digitizer 12 receives composite video signal 13, and provides vertical sync output 30, horizontal sync output 32, pixel clock output 34, and data output 36. Vertical and horizontal sync outputs 30 and 32, respectively are provided to data processor 20. Video line digitizer 12 may be implemented as a microchip, model number AD9502, manufactured by Analog Devices, Norwood, Mass. Optionally, operational amplifier 102 may be electrically interposed in series between the video output of a video source such as camera 14 (shown in FIG. 1) and composite video input signal 13 of video line digitizer 12 in order to isolate the output of video camera 14 from line digitizer 12.

Double-buffered video RAM 16 includes RAM input buffer 16a having VLD data buffer 120 which includes data output 122 and data input 123. Output 122 is operably coupled to data input 127 of random access memory (RAM) 16, and data input 123 is operably coupled to data output 36 of video line digitizer 12. RAM 16, a high speed device, includes data output 126 and address input 128. RAM input buffer 16a also includes VLD address buffer 130 having input 131 and output 132. Double buffered video RAM 16 includes data processor address buffer 135 having address input 136 and address output 137. Address output 132 of VLD address buffer 130 and address output 137 of processor address buffer 137 are operably coupled to address input 128 of RAM 16. Processor data buffer 140 includes data input 142 operably coupled to data output 126 of RAM 16 and data output 143. Memory addresses are provided to address input 128 of RAM 16 so that digitized video data received through data input 127 of RAM 16 is sequentially stored in address cells so that the stored data can be retrieved later and located in a specific order. Buffers 120, 130, 135, and 140 serve as "switches" in order to provide selective access to RAM 16: video line digitizer 12 "writes" to RAM 16 through buffers 120 and 130; data processor 20 "reads" RAM 16 through buffers 135 and 140.

Address decoder/controller 18 includes flip-flop 150 having input 151 operably coupled to horizontal sync output 32 of video line digitizer 12 and output 152 that is operably coupled to input 155 of delay counter 156. Output 158 of delay counter 156 is operably coupled to enable input 167 of pixel counter 165. Delay counter 156 is operably coupled to dip switch 160. Pixel counter 165 includes clock input 166 operably coupled to clock output 34 of video line digitizer 12, address output 168 operably coupled to address input 131 of buffer 130, and end-of-line output 169. Address decoder/controller 18 also includes decoder 170 having address input 171, address output 172, and address output 173 operably coupled to address input 136 of processor address buffer 135. Address decoder 170 allows data processor 20 to also communicate address information to RAM 16.

Data processor 20 may be implemented as any suitable digital data processor or microprocessor, such as an eight-bit, 2 MHz microcomputer, model MMC/102X, manufactured by R. J. Brachman Assoc., Havertown, Pa. Data processor 20 includes horizontal sync input 182 operably coupled to horizontal sync output 32, vertical sync input 184 operably coupled to vertical sync output 30, data input 186 operably coupled to data output 143 of processor data buffer 140, end-of-line input 188 operably coupled to output 169 of pixel counter 165, and address output 190 operably coupled to input 171 of decoder 170. Data processor 20 also includes RAM 44 which receives data from RAM 16 via data input 186 through means, not shown, as would be readily understood by one skilled in this field of technology. RAM 44 also includes address input 204 operably coupled to address output 172 of decoder 170 and stores the data upon which mathematical operations are performed by data processor 20. The operation of line digitizer 10 is described with respect to FIG. 3 as follows: An external event line counter (not shown) incorporated into the firmware resident in data processor 20 identifies the desired line for digitization. This external event line counter is reset for each new frame of video by receipt of a vertical sync pulse provided by vertical sync output 30 from video line digitizer 12 and is incremented line by line with the arrival of each horizontal sync pulse provided by horizontal sync pulse output 32. Delay counter 156 identifies the beginning of video data in the composite signal at a predetermined time after a horizontal sync pulse is received in order to ensure that digitization of video data begins at the beginning of the horizontal line of interest (See FIG. 7). Pixel counter 165 identifies the end of the data to be recorded in order to properly terminate the digitization sequence at the end of the line. Counters 156 and 165 are preferably implemented in hardware as opposed to software in order to achieve the quick response necessary to store this data in real-time.

Still referring to FIG. 3, delay counter 156 is driven by the pixel clock output of video line digitizer 12, and is reset by a horizontal sync pulse which causes flip-flop 150 to change state. The length of the desired delay of delay counter 156 is determined by the settings of dip switch 160. In the preferred embodiment, dip switch 160 is set to provide a delay of approximately 90 clock pulses so that storage of the digitized data begins at the beginning of a horizontal video line (See FIG. 7). However, the setting of dip switch 160 may vary slightly, depending on the characteristics of the composite video signal. Pixel counter 165 then is started after delay counter 156 times out and begins to increment the outputs corresponding to addresses of RAM 16 while RAM 16 successively stores the digitized outputs of video digitizer 12. This process is repeated for each new line in the frame, with the previous values of video data stored in the address cells of RAM 16 being overwritten by new data for the current line. When the line counter of data processor 20 reaches a number corresponding to the predetermined line of interest and the pixel counter reaches a number corresponding to the last pixel in the line, the "data acquisition" process is halted, and the "processing" mode commences.

In the "processing" mode, output 194 of data processor 20 proVides a signal to inputs 124 and 133 of buffers 120 and 130, respectively, in order to simultaneously change the operating states of buffers 120 and 130 in order to isolate RAM 16 from digitizer circuit 12. Data processor 20 also provides a signal from output 196 to inputs 138 and 144 of buffers 135 and 140, respectively, in order to simultaneously change the operating states of buffers 135 and 140, thus facilitating transfer of the data stored in RAM 16 to RAM 44 so that the data can be used for subsequent mathematical operations such as digital picture processing. Data link 50, which may be an RS-232 serial link coupled to data processor 20, provides a signal corresponding to the results of any processing algorithms intended to identify some particular scene attribute, to a host computer, data processor, or other microprocessor.

Applications of the present invention may include, but are not limited to: detection of motion (intrusion) in a scene under surveillance; the reading of bar codes; as well as the determination of location and orientation of a stripe on a floor or deck surface, where the stripe may be used as a guide for a mobile platform such as a robot or an automated guided vehicle. Techniques of digital picture processing are well known by those skilled in this field of technology, and are discussed in: Azriel Rosenfeld and Avinast C. Kak, *Digital Picture Processing*, Second Edition, Volumes 1 and 2, Academic Press, (1982). For example, techniques for thresholding, edge detection, and feature detection are discussed. Id, Volume 2, Chapter 10.

Figure 4:
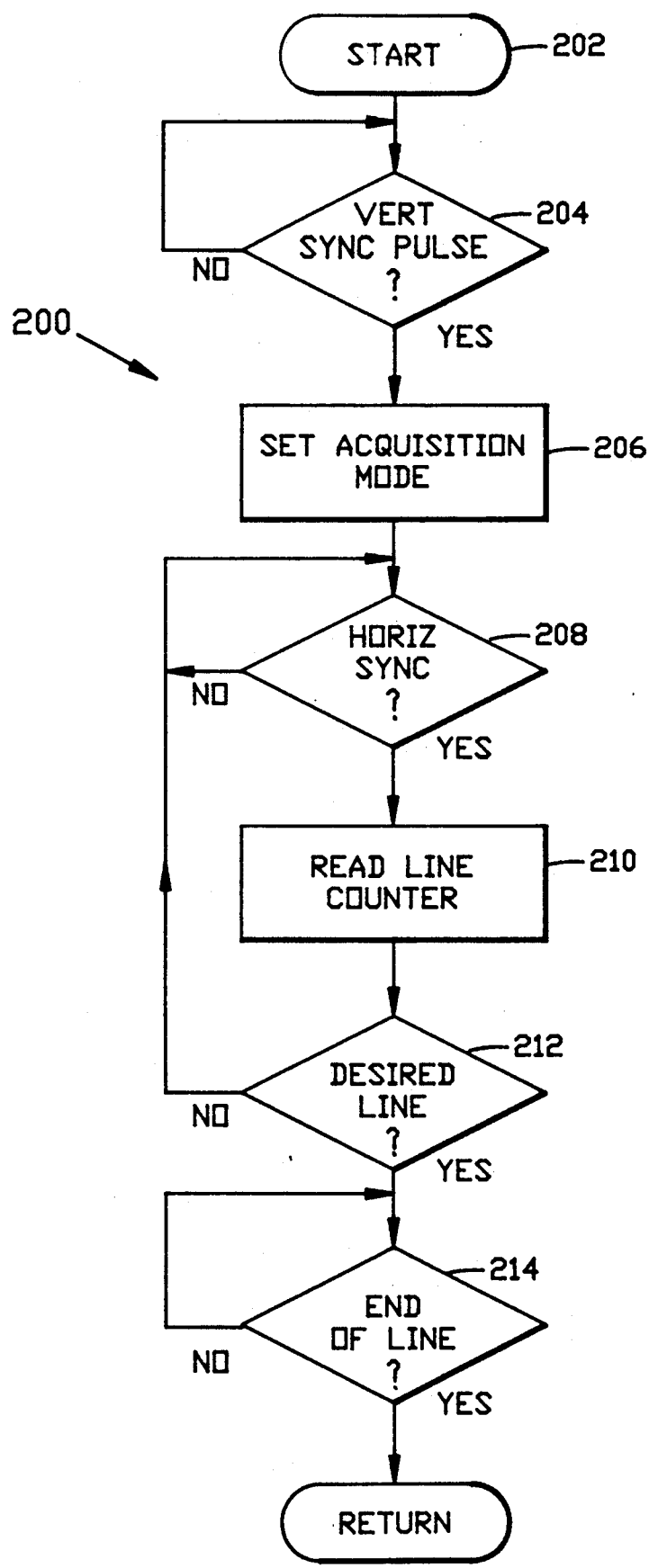
FIG. 4 is a flow chart that illustrates a subroutine for identifying, digitizing, and storing a predetermined line of a video frame.

Data processor 20 may be programmed to "capture" a predetermined line of a composite video signal when in the "data acquisition" mode in accordance with the flow chart depicted in FIG. 4. Program 200 would most likely be implemented as a subroutine of a main program along with any other subroutines which may be used to process the "captured" data during the processing mode. Program 200 is entered at 202 and proceeds to 204 where a decision is made as to whether a vertical sync pulse has been received by data processor 20. If the answer to the decision at 204 is "NO," program 200 loops until a vertical sync pulse is received, after which the program instructs reconfigurable video line digitizer 10 to go into the "acquisition" operating mode at 206, as previously described. Next, the program proceeds to 208 where a decision is made to determine whether a horizontal sync pulse has been received by data processor 20. If the decision is "NO," the program loops continuously until a horizontal sync pulse has been received, after which program 200 proceeds to 210 which directs data processor 20 to read the external-event line counter, which is incremented by arrival of horizontal sync pulses as previously described. Program 200 proceeds to 212 where a decision is made as to whether the line being read is the predetermined line of interest which is to be digitized and stored. The number of the predetermined line may be provided as an input to data processor 20 from another device, such as a host computer, not shown, via data link 50. If the line being read is not the desired line, the program goes back to step 208. Once a decision is made at 212 that the predetermined line of interest is being read, a decision is made at 214 as to whether the predetermined line has been completely read. If the decision at 214 is "NO," the program loops until the end of the predetermined line is indicated. Program 200 may then return to a main program as shown, which marks the end of the "data acquisition" phase.

Data processor 20 may also be operated so that different predetermined lines may be captured and be varied in successive frames, depending on the outcomes of various decisions made by data processor 20 or based on inputs provided to data processor 20. The ability of the present invention to select predetermined lines which are to be stored and analyzed may be characterized as "reconfigurability."

Figure 5:
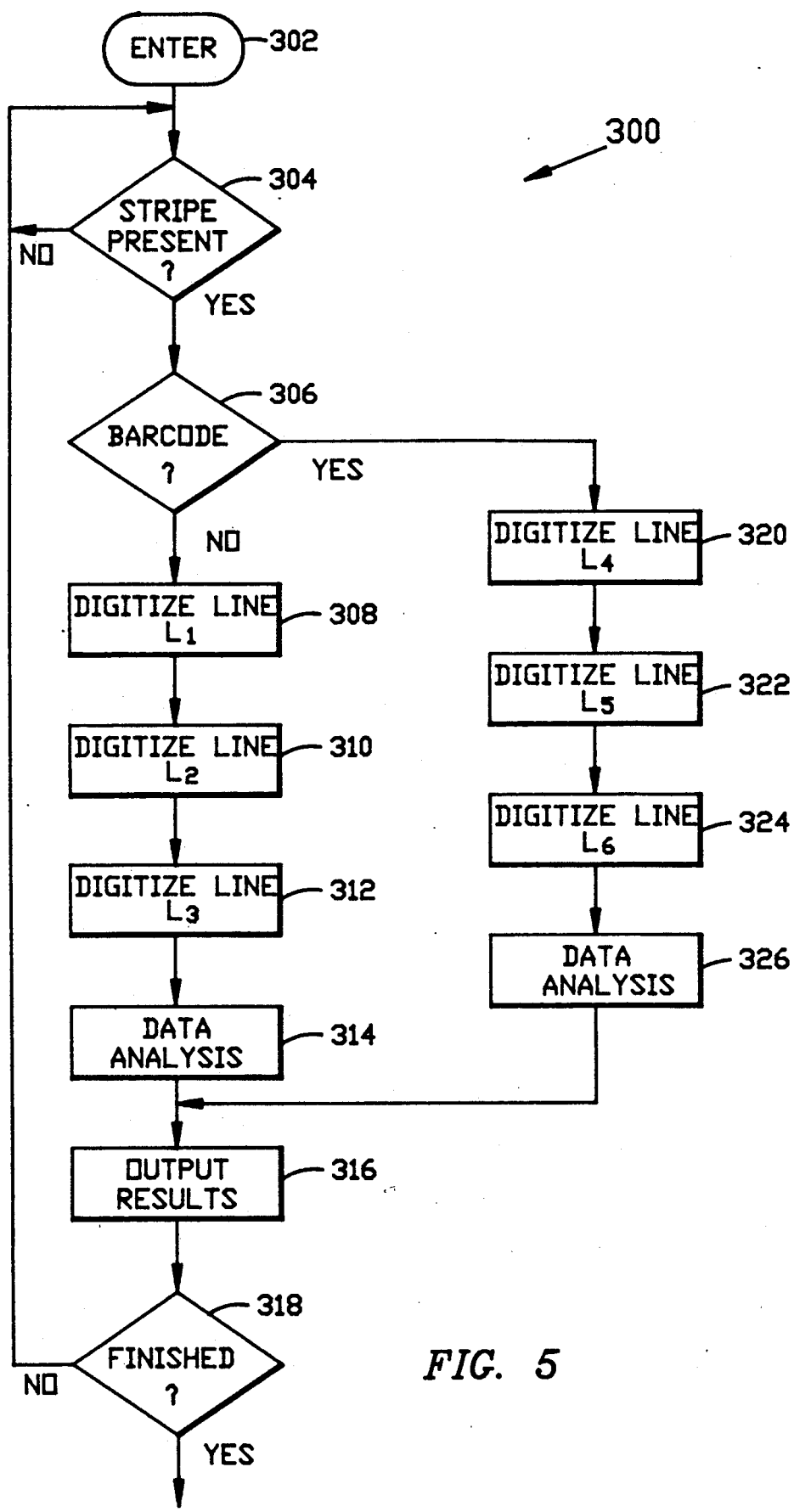
FIG. 5 is a flow chart that illustrates one scheme by which the present invention may reconfigure itself to identify and store different lines of successive video frames in response to the outcomes of one or more decisions using the subroutine presented in FIG. 4.
Figure 6A:
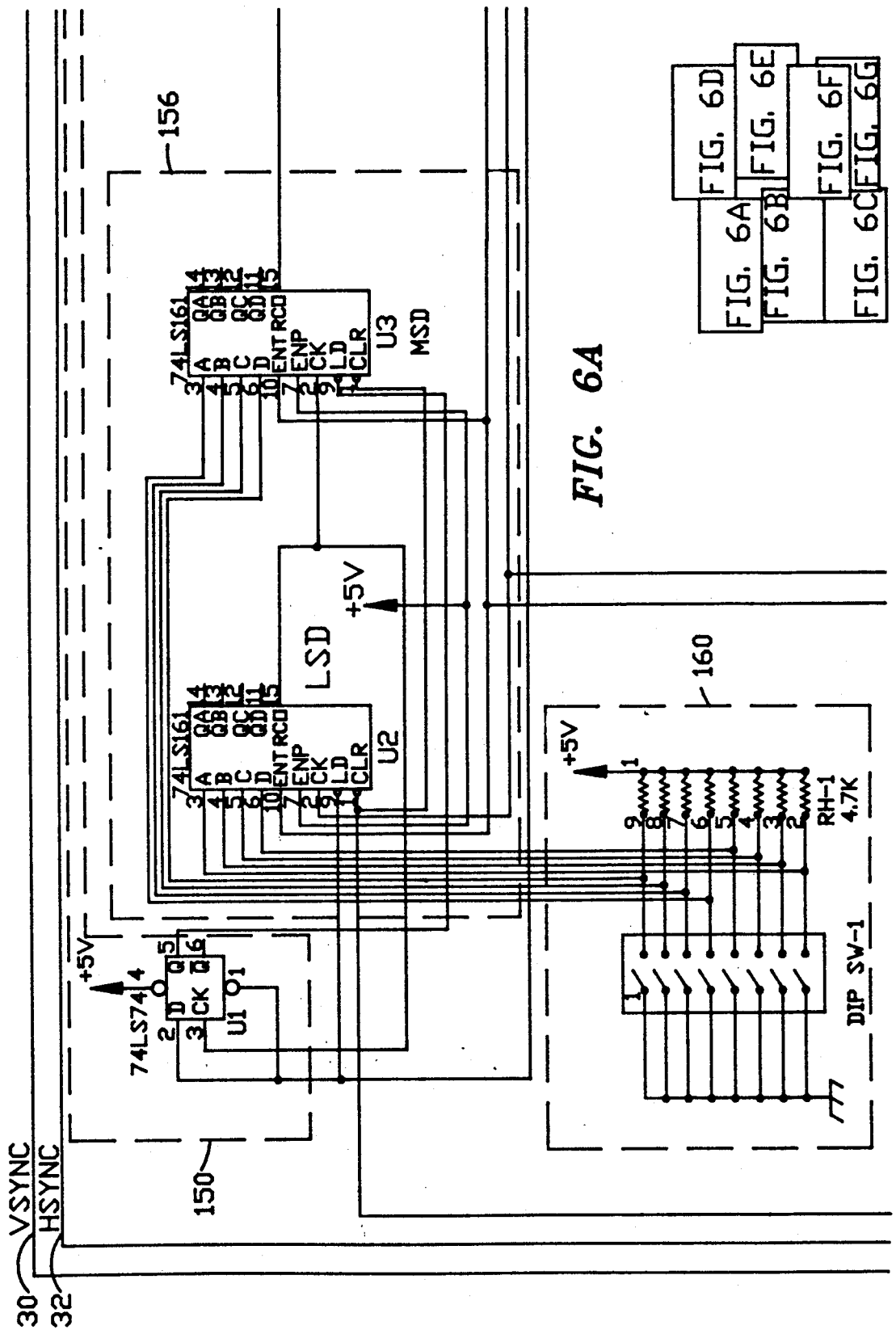
Figure 6B:
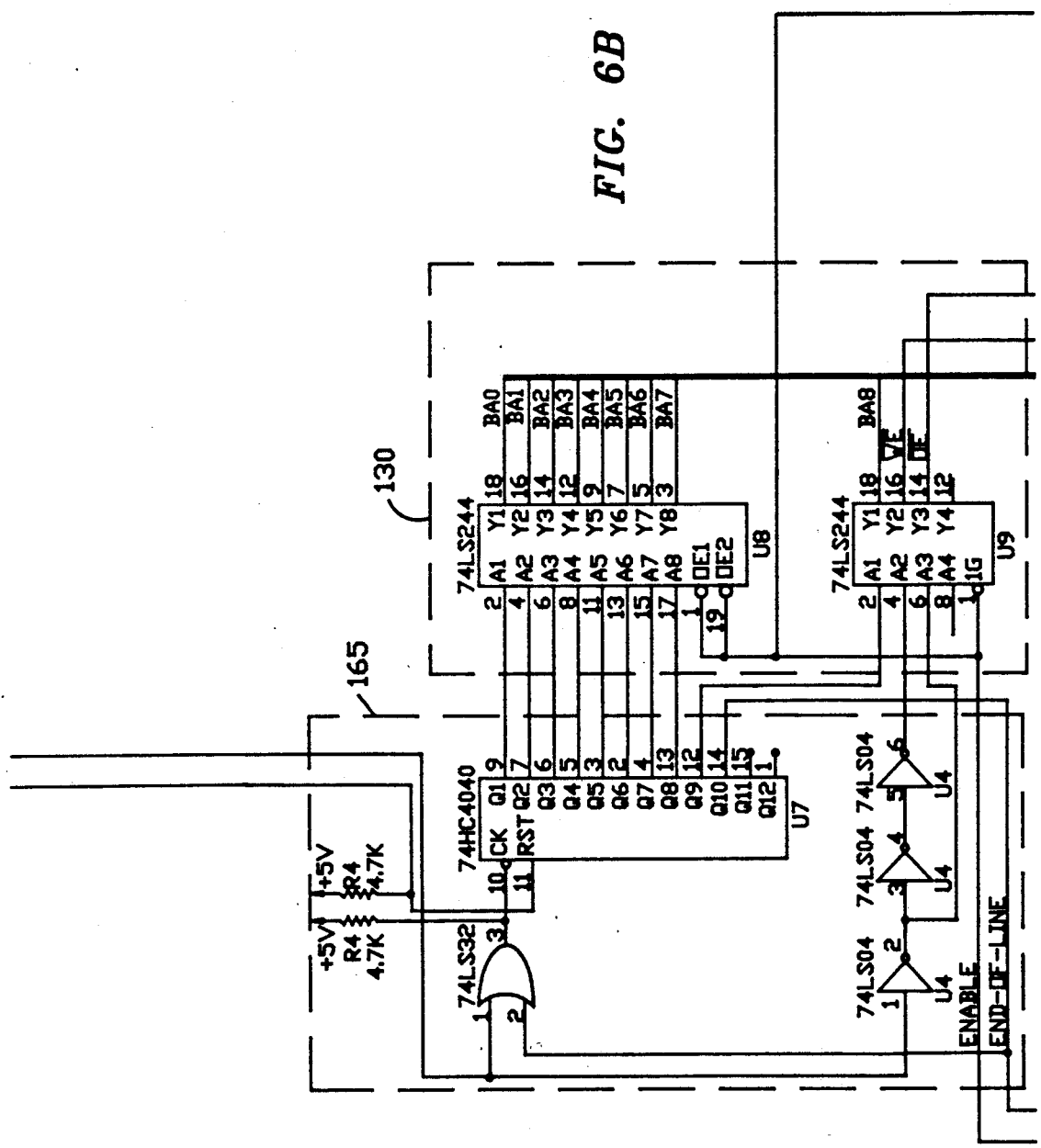
Figure 6D:
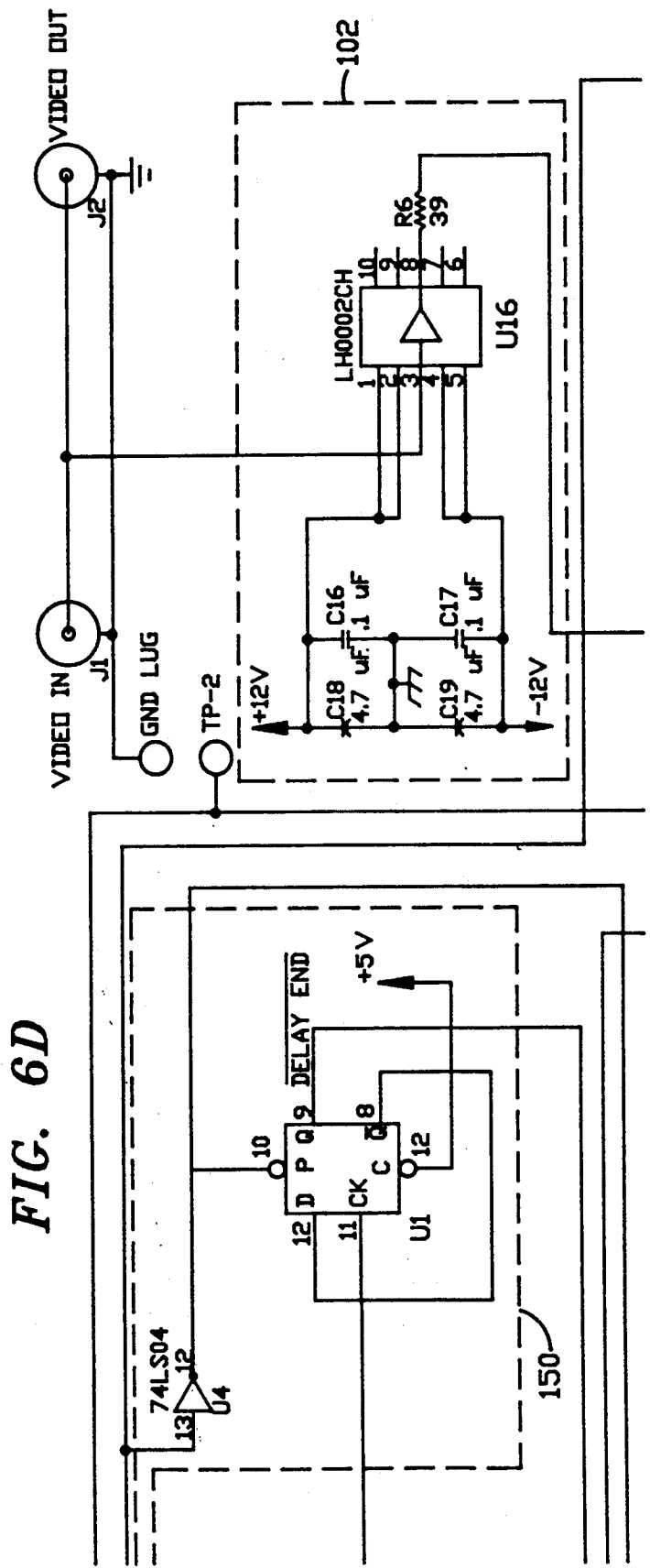
Figure 6E:
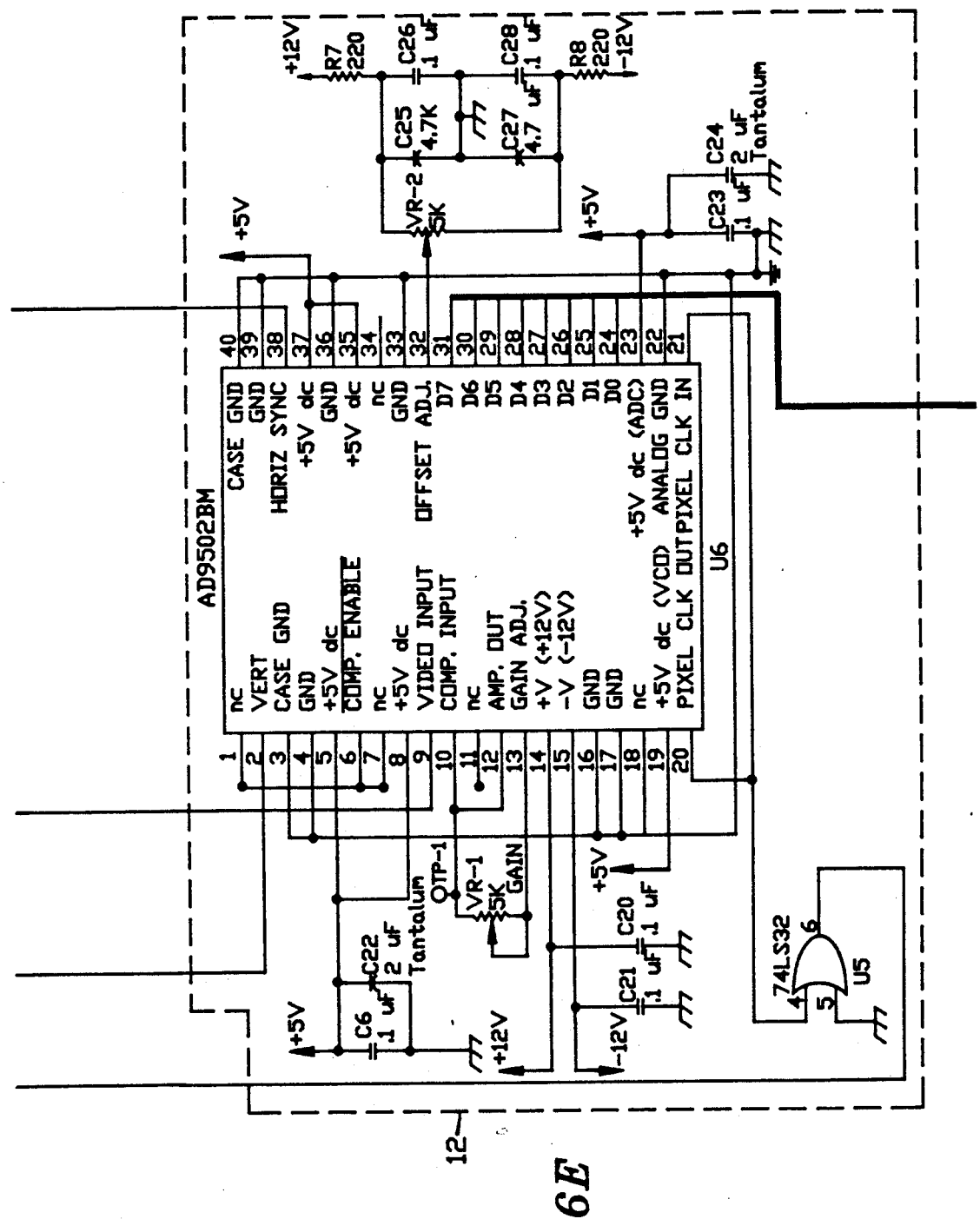
Figure 6G:
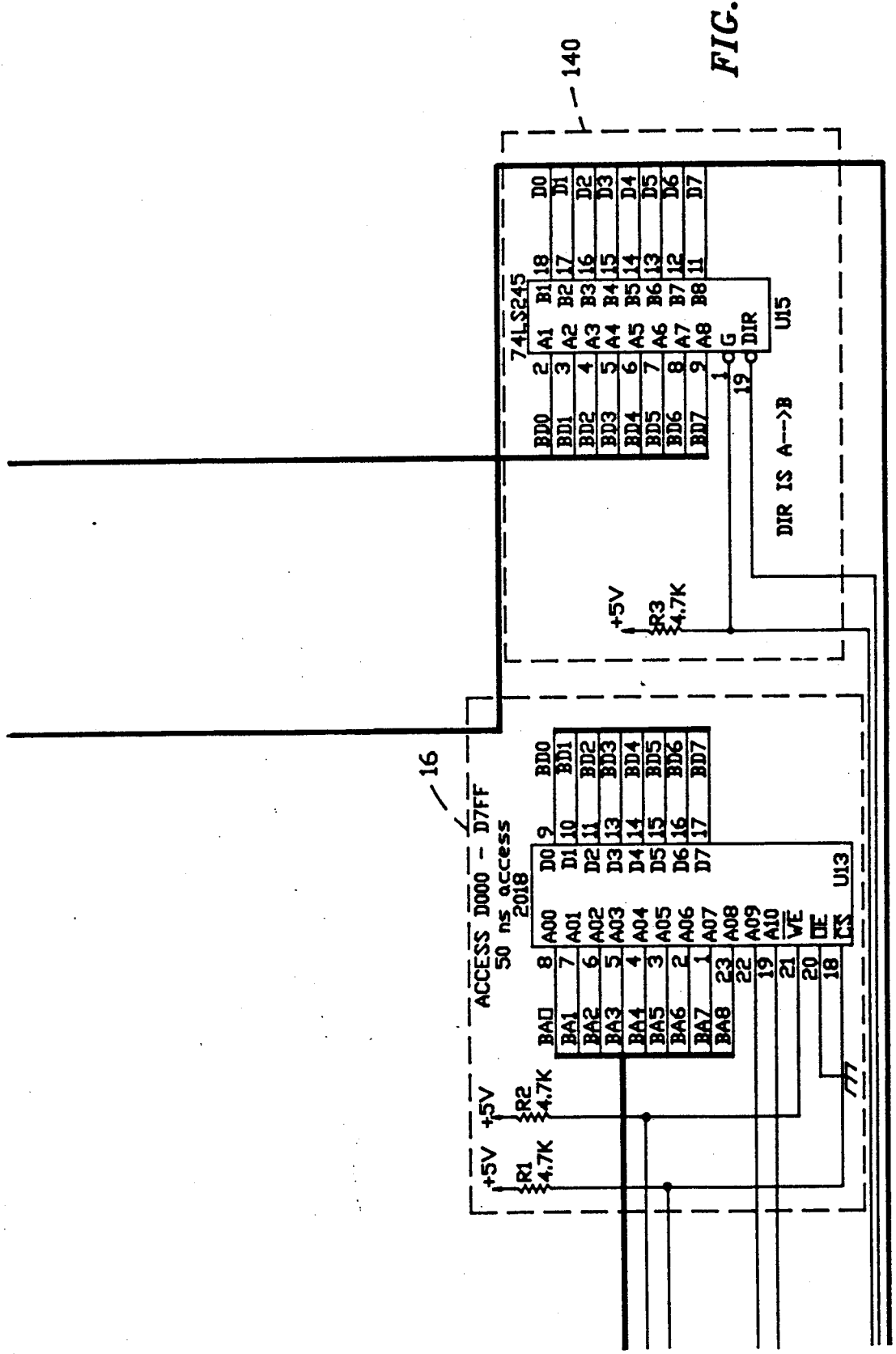

One example of a manner of programming data processor 20 so that video line digitizer 10 operates in a reconfigurable mode is presented in FIG. 5. The flowchart illustrates a portion of the code for an application which involves tracking a guidepath or stripe along the floor, for purposes of guiding a vehicle along an intended route. The nature of the stripe and the associated structured light source employed on the vehicle are chosen so that the presence of the stripe generates a significantly higher image intensity than that of the ambient background. Pixel intensity values across a horizontal line of video obtained from a camera viewing the stripe will peak sharply as the left edge is encountered, remain fairly constant across the stripe, and then drop sharply to ambient levels at the right edge. One method of locating the stripe position would be to employ a classical "edge-finding" algorithm which thresholds the digital data representation to generate a binary image wherein each pixel has been reduced from 256 possible gray scale values to only two allowed states: stripe present or stripe absent. In this example, thresholding can be easily accomplished by first finding the maximum scene intensity value, and then multiplying that maximum by a scaling factor less than one (i.e., "0.85" which is typical). The resulting value then becomes the threshold for comparison: all pixel intensities below the threshold are discarded; all values above the threshold are attributed to the presence of the line. By way of example only, and without intending to limit the scope of the invention, the outcomes of certain decisions in the flow chart shown in FIG. 5 vary depending on whether video line digitizer 10 is determining the location and orientation of a guide stripe, or reading a bar code encoded laterally on the a stripe. Referring to FIG. 5, flow chart 300 is entered at 302 and proceeds to 304 which determines if a stripe is present. If the decision at 304 is "NO," the programs loops continuously until a stripe is detected. Once a stripe is detected, the outcome of 304 is "YES," and program 300 proceeds to 306 which determines if a barcode is present on the stripe. If the decision at 306 is "YES," program 300 proceeds to steps 320, 322, and 324 which instructs reconfigurable video line digitizer 10 to store and analyze three predetermined lines, $L_4$, $L_5$, and $L_6$. Steps 320, 322, and 324 each call subroutine 200, illustrated in FIG. 4. Although, program 300 has been described as calling subroutine 200 three times to store and compare three predetermined lines, this description has been presented by way of example only. It is to be understood that program 200 may be called any number of times to store and compare any number of predetermined lines in order to suit the requirements of a particular application, providing sufficient RAM is available to store the data.

After the lines are stored, program 300 proceeds to step 326 which subjects the data representing the stored lines to mathematical analysis in order to decode the barcode by any number of techniques well known to those skilled in this art. Program 300 proceeds to 316 and provides an output functionally related to the barcoded information. Program 300 proceeds to 318 which determines if the process is to continue, or if data processor 20 is finished gathering data. If the decision at 318 is "NO," the program proceeds back to 304. If the decision at 318 is "YES," the program is exited.

If the decision at 306 is "NO," the program proceeds to steps 308, 310, and 312 which each instruct video line digitizer to call subroutine 200 in order to store, by way or example, three lines, $L_1$, $L_2$, and $L_3$, or any number of lines of the video signal, depending on the requirements of the particular application. Program 300 then proceeds to 314 which subjects the data representing the stored lines to mathematical analysis in order to determine the offset (position) and orientation of the guide stripe, by any number of well known techniques, and then continues to step 316. The stripe position and orientation may be relayed to the host computer via data link 50 for purposes of controlling the motion of the vehicle.

FIGS. 6A-6G collectively comprise a schematic diagram that illustrates a specific means of implementing reconfigurable video line digitizer 10 and is offered by way of example only. It is to be understood that the scope of the invention comprehends implementation by means other than as specifically described herein, as would be apparent to one skilled in this art.

Referring now to FIGS. 6A-6G collectively, a video signal such as an NTSC composite video signal is brought into one of two RCA jacks J1 and J2, which are in parallel. The composite video signal is then amplified by amplifier 102 (U16) which is an LH0002CN current amplifier. From the amplifier 102, the composite video signal is then brought into video line digitizer 12 (U6) which is an AD9502BM Video Digitizer from Analog Devices. This module receives a composite video signal and performs a flash analog to digital (A/D) conversion, producing 512 bytes per scan line of information in real-time. It also strips out the vertical and horizontal syncs from the composite video signal, making them available for synchronization, and provides a 9.83 MHz pixel clock. Two multi-turn 5K trim pots, one for gain and the other for offset, are provided in the circuitry for fine-tuning.

The VERT SYNC output 30 from video line digitizer 12 is sent to data processor 20 (MMC/102X microcomputer) over input 184 (PB7 and CA2), and read by the system firmware to begin frame processing. The HORIZ SYNC output 32 is sent to the MMC/102X over input 182 (PB6 and CA1), used to initiate scan line digitization. HORIZ SYNC is also inverted by U4 of delay counter 156 and used to clear the U1 DELAY END signal and the MSD LD input of flip-flop 150 (U1). The MMC/102X enables the "data acquisition" mode using output PB5; then when a HORIZ SYNC signal comes in, the horizontal delay counter 156 (U2 and U3) loads in the count from dip switch 160 (DIP SW-1) and begins counting PIXEL CLK pulses received from video line digitizer 12.

When a predetermined number of pixel counts has been reached (around 90 pulses for an NTSC video signal), MSD counter U3 times out via RCO and causes the DELAY END signal of U1 to go low. This signal shuts down counters U2 and U3 and simultaneously releases U7 RST of pixel counter 165 which has been held high. This initiates the storing of actual video line data and allows the AD9502 to begin writing its A/D output to video RAM 16 (U13) as controlled by U7. U7 is a 14-stage ripple counter which now begins counting PIXEL CLK pulses. When PB3 of MMC/102X is low, the AD9502 has access to the dual-ported video RAM U13, which receives the A/D information. U7 of pixel counter 165 increments with each pixel count and thus provides addressing for inputs A0-A8 of video RAM (U13). A9 and A10 of U13 are controlled by PB0 and PB1 outputs labelled Blk0 and Blk1 from the MMC-102X, and determine the present block of 512 bytes of digitized output that is to be received by U13 from U6. When a total of 512 pulses have been counted, the end-of-line output pin 14 of U7 (labeled Q10) goes high, which disables the PIXEL CLK gate on U5 of pixel counter 165 and tells the MMC/102X via PB4 that a video line has been digitized. As previously discussed above, data processor 20 (MMC-102X) maintains an internal counter that increments each time a HORIZ SYNC pulse is received from the AD9502, and allows the digitizer to continuously overwrite itself in video RAM, until the counter reaches the value of the selected line of interest. When digitization of this specified line is finished, the MMC/102X detects the end-of-line output of U7 going high via input PB4, and switches its output PB5 to low, disabling digitization. PB3 of MMC/102X is sent high, denying the AD9502 access to the dual-ported video RAM U13, and output PB2 is set low, which now gives the MMC/102X access to RAM U13. The MMC-102X then transfers digitized data corresponding to the predetermined line of interest from video RAM 16 (U13) to storage RAM 44 (U12), which is a standard 2K RAM accessed from D800 to DFFF.

Obviously, many modifications and variations of the present invention are possible in the light of the above teachings. It is therefore to be understood that within the scope of the appended claims the invention may be practiced otherwise than as specifically described.

I claim:

1. A video line digitizer, comprising:

first means having a composite video signal input for converting a composite video signal having an analog component into a series of digital data representations of said analog component, said composite video signal consisting of successive frames, each frame consisting of a fixed number of lines, each line having a fixed number of pixels, each pixel having an associated intensity, and for providing synchronization signals decoded from said video signal, said series of digital data representations corresponding to said intensities of said pixels of said lines;

second means, operably coupled to receive said series of digital data representation from said first means, for storing a subset of said series of digital data representations corresponding to a predetermined line of a frame of said video signal in a memory, said subset comprising subset data;

third means operably coupled to receive said synchronization signals from said first means and operably coupled to said second means for directing said second means to sequentially store said subset in said memory upon receipt by said second means of an address signal, said third means having an address input; and fourth means operably coupled to receive said synchronization signal from said first means and said subset data from said second means, and having an address output operably coupled to provide said address signal to said address input of said third means, for causing said second means to download said subset to said fourth means.

2. The video line digitizer of claim 1 wherein said first means comprises:

a sync stripper having said composite video signal input for decoding said composite video signal and for providing a horizontal sync output, a vertical sync output, and a pixel clock output; and a flash analog-to-digital converter having said composite video signal input and a data output for converting said analog component of said composite video signal into said series of digital data representations.

3. The video line digitizer of claim 2 wherein:

said fourth means is a digital data processor having a random access memory, an end-of-line input, horizontal and vertical sync inputs operably coupled to receive said horizontal and vertical sync outputs, respectively, from said sync stripper, an address output, a data bus output, and first and second "change state" outputs; and said third means comprises:

a flip-flop having a horizontal sync input operably coupled to said horizontal sync output of said sync stripper, and a delay counter control output;

a delay counter having a first input operably coupled to said delay counter control output of said flip-flop, a second input operably coupled to said pixel clock output of said sync stripper, and an output;

a dip switch programmed to have a predetermined delay operably coupled to said delay counter for delaying the output of said delay counter until said delay counter has counted a predetermined number of pixel counts corresponding to said delay, said predetermined number of pixel counts corresponding to the beginning of said analog component of said composite video signal;

a pixel counter having a pixel clock input operably coupled to said pixel clock output of said sync stripper, a delay counter input operably coupled to said output of said delay counter for inhibiting operation of said pixel counter for a predetermined number of clock pulses, an address output operably coupled to said second means for providing address locations in said second means in which said subset data are stored, and an end-of-line counter output operably coupled to said end-of-line input of said digital data processor; and an address decoder having an address input operably coupled to said address output of said digital data processor, a first address output for providing a first address signal to said random access memory of said digital data processor, and a second address output for providing said second address output to said second means.

4. The video line digitizer of 3 wherein:

said second means comprises:

a first buffer having a data input operably coupled to said data output of said analog-to-digital converter, a "change state" input operably coupled to said first "change state" output from said digital data processor, and a data output for providing said subset data;

a second buffer having an address input operably coupled to said address output of said pixel counter, a "change state" input operably coupled to said first "change state" output of said digital data processor, and an address output;

a random access memory having a data input operably coupled to receive said subset data from said data output of said first buffer, an address input operably coupled to said address output of said second buffer, and a data output;

a third buffer having a data input operably coupled to said data output of said random access memory, a "change state" input operably coupled to said second "change state" output of said digital data processor, and a data output operably coupled to said digital data processor; and a fourth buffer having an address input operably coupled to said address output of said output address decoder, a "change state" input operably coupled to said second "change state" output of said digital data processor, and an address output operably coupled to provide said address input of said random access memory.

5. The video line digitizer of claim 1 wherein:
said first means comprises:
a sync stripper having said composite video signal input for decoding said composite video signal and for providing a horizontal sync output, a vertical sync output, and a pixel clock output; and
a flash analog-to-digital converter having said composite video signal input and a data output for converting said analog component of said composite video signal into said series of digital data representations;
said fourth means is a digital data processor having a random access memory, an end-of-line input, horizontal and vertical sync inputs operably coupled to receive said horizontal and vertical sync outputs, respectively, from said sync stripper, an address output, a data bus output, and first and second "change state" outputs, and a data link;
said third means comprises:
a flip-flop having a horizontal sync input operably coupled to said horizontal sync output of said sync stripper, and a delay counter control output;
a delay counter having a first input operably coupled to said delay counter control output of said flip-flop, a second input operably coupled to said pixel clock output of said sync stripper, and an output;
a dip switch operably coupled to said delay counter for delaying the output of said delay counter until said delay counter has counted a predetermined number of pixel counts, said predetermined number of pixel counts corresponding to the beginning of said analog component of said composite video signal;
a pixel counter having a pixel clock input operably coupled to said pixel clock output of said sync stripper, a delay counter input operably coupled to said output of said delay counter for inhibiting operation of said pixel counter for a predetermined number of clock pulses, an address output operably coupled to said second means for providing address locations in said second means in which said subset data are stored, and an end-of-line counter output operably coupled to said end-of-line input of said digital data processor; and
an address decoder having an address input operably coupled to said address output of said digital data processor, a first address output for providing a first address signal to said random access memory of said digital data processor, and a second address output for providing said second address output to said second means; and
said second means comprises:
a first buffer having a data input operably coupled to said data output of said analog-to-digital converter, a "change state" input operably coupled to said first "change state" output from said digital data processor, and a data output for providing said subset data;

a second buffer having an address input operably coupled to said address output of said pixel counter, a "change state" input operably coupled to said first "change state" output of said digital data processor, and an address output;
a random access memory having a data input operably coupled to receive said subset data from said data output of said first buffer, an address input operably coupled to said address output of said second buffer, and a data output;
a third buffer having a data input operably coupled to said data output of said random access memory, a "change state" input operably coupled to said second "change state" output of said digital data processor, and a data output operably coupled to said digital data processor; and
a fourth buffer having an address input operably coupled to said second address output of said decoder, a "change state" input operably coupled to second "change state" output of said digital data processor, and an address output operably coupled to provide said address input of said random access memory.

6. The video line digitizer of claim 5 wherein:
said digital data processor identifies said subset data corresponding to said pixels having intensity values corresponding to a predetermined attribute.

7. The video line digitizer of claim 6 which further includes:
a video camera having a composite video signal output operably coupled to said composite video signal inputs of said sync stripper and flash analog-to-digital converter.

8. The video line digitizer of claim 5 wherein:
said digital data processor compares said subset data corresponding to a predetermined line of a first frame of said composite video signal to said subset data corresponding to said predetermined line of a second frame of said composite video signal.

9. The video line digitizer of claim 8 which further includes:
a video camera having a composite video signal output operably coupled to said composite video signal inputs of said sync stripper and flash analog-to-digital converter.

10. The video line digitizer of claim 5 wherein:
said digital data processor compares said subset data corresponding to a plurality of predetermined lines of a first frame of said composite video signal to said subset data corresponding to said plurality of predetermined line of a second frame of said composite video signal and provides an output functionally related to said comparisons.

11. The video line digitizer of claim 10 which further includes:
a video camera having a composite video signal output operably coupled to said composite video signal inputs of said sync stripper and flash analog-to-digital converter.

12. The video line digitizer of claim 5 wherein:
said digital data processor determines which of said lines of said composite video signal are to be stored in said random access memory based on the outcomes of mathematical analyses performed by said digital data processor on said subset data.

13. The video line digitizer of claim 12 which further includes:

a video camera having a composite video signal output operably coupled to said composite video signal inputs of said sync stripper and flash analog-to-digital converter.

14. The video line digitizer of claim 1 wherein:
said digital data processor compares said subset data corresponding to a predetermined line of a first frame of said composite video signal to said subset data corresponding to said predetermined line of a second frame of said composite video signal.

15. The video line digitizer of claim 1 wherein:
said digital data processor compares said subset data corresponding to a plurality of predetermined lines of a first frame of said composite video signal to said subset data corresponding to said plurality of predetermined line of a second frame of said composite video signal and provides an output functionally related to said comparisons.

16. The video line digitizer of claim 1 wherein:
said digital data processor determines which of said lines of said composite video signal are to be stored in said memory based on the outcomes of mathematical analyses performed by said digital data processor on said subset data.

17. A method for storing and comparing predetermined lines of a composite video signal, comprising the steps of:
converting a composite video signal having an analog component into a series of digital data representations of said composite video signal, said video signal consisting of successive frames, each frame consisting of a fixed number of lines, each line represented by a fixed number of pixels, each pixel having an associated intensity, said digital data representations corresponding to said intensities of said pixels of said lines;
storing each of said series of digital data representations corresponding to a predetermined line of said composite video signal in a memory; and
identifying data included within said digital data representations, said data corresponding to said pixels having intensity values corresponding to a predetermined attribute.

18. A method for storing and comparing predetermined scan lines of a composite video signal, comprising the steps of:
converting a composite video signal having an analog component into a series of digital data representations of said composite video signal, said video signal consisting of successive frames, each frame consisting of a fixed number of scan lines, each said scan line represented by a fixed number of pixels, each pixel having an associated intensity, said digital data representations corresponding to said intensities of said pixels of said scan lines;
storing each of said series of digital data representations corresponding to a first predetermined scan line of said composite video signal in a random access memory; and
identifying an updated set of said digital data representations which are to be stored in said random access memory based on the outcomes of mathematical analyses performed by a digital data processor on said series of digital data representations which were previously stored.

19. A method for comparing scan lines of a composite video signal, comprising the steps of:
a) converting a composite video signal having an analog component into a series of digital data representations of said composite video signal, said video signal consisting of successive frames, each frame consisting of a fixed number of said scan lines, each said scan line represented by a fixed number of pixels, each pixel having an associated intensity, said digital data representations corresponding to said intensities of said pixels of said scan lines;
b) storing an mth series of said digital data representations, corresponding to an mth set of said scan lines, in a memory, said mth set comprising at least one predetermined scan line, where m is a positive integer;
c) identifying an (m+1)th series of said digital data representations, corresponding to an (m+1)th set of said scan lines comprising at-least one of said scan lines, based on the outcomes of mathematical analyses performed by a digital data processor on said mth series of digital data representations;
d) storing said (m+1)th series of digital representations in said memory; and
e) repeating steps (a) through (d) an n number of times, where n is a positive integer.

* * * * *